UNITED STATES PATENT OFFICE.

ALFRED FERRIS, OF BENVILLE, INDIANA.

IMPROVED COMPOSITION FOR PAINT.

Specification forming part of Letters Patent No. 59,573, dated November 13, 1866.

*To all whom it may concern:*

Be it known that I, ALFRED FERRIS, of Benville, in the county of Jennings and State of Indiana, have invented a new and useful Improvement in Compositions for Paint; and I do hereby declare the following to be a full, clear, and exact description of the same, including all the materials used and the mode of compounding the same.

The object of my invention is to afford a durable and inexpensive paint for outdoor work, and for iron, which will retain its original luster, and present an impervious coating for the wood or other substance to which it may be applied.

My improved paint is composed of the following elements, in the proportions named, and prepared in the manner described, viz: To one (1) quart of crude coal-tar one (1) ounce of sulphate of iron and one (1) ounce of rosin, or one (1) ounce of asphaltum, are added. The whole is then boiled and stirred together for a few minutes until the ingredients are completely mixed and combined, then strained while hot.

This composition affords a paint of a good and permanent luster, and, unlike many compositions into which coal-tar and rosin enter as elements, it spreads easily with the brush, being used with as great facility as common oil-paints.

Having described my improved composition for a paint, what I claim as new, and desire to secure by Letters Patent of the United States, is—

An improved composition for paint, consisting of the materials in substantially the proportions and compounded in the manner described.

ALFRED FERRIS.

Witnesses:
 IRA S. DRAKE,
 JACOB S. DRAKE.